(12) United States Patent
Ideuchi et al.

(10) Patent No.: US 10,614,035 B2
(45) Date of Patent: Apr. 7, 2020

(54) INFORMATION PROCESSING SYSTEM, INFORMATION PROCESSING METHOD, AND COMPUTER PRODUCT

(71) Applicant: FUJITSU LIMITED, Kawasaki-shi, Kanagawa (JP)

(72) Inventors: Masao Ideuchi, Atsugi (JP); Masahiro Kataoka, Tama (JP); Takashi Furuta, Setagaya (JP); Shinichiro Nishizawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 995 days.

(21) Appl. No.: 14/336,299

(22) Filed: Jul. 21, 2014

(65) Prior Publication Data

US 2015/0032705 A1 Jan. 29, 2015

(30) Foreign Application Priority Data

Jul. 29, 2013 (JP) .................................. 2013-157196

(51) Int. Cl.
| | |
|---|---|
| G06F 17/30 | (2006.01) |
| G06F 16/174 | (2019.01) |
| G06F 16/28 | (2019.01) |
| G06F 16/903 | (2019.01) |
| G06F 16/33 | (2019.01) |

(52) U.S. Cl.
CPC ........ *G06F 16/1744* (2019.01); *G06F 16/285* (2019.01); *G06F 16/3338* (2019.01); *G06F 16/90335* (2019.01)

(58) Field of Classification Search
CPC ......... G06F 17/30153; G06F 17/30598; G06F 17/30672; G06F 17/30979

USPC ......................................................... 707/693
See application file for complete search history.

(56) References Cited

U.S. PATENT DOCUMENTS

| | | | |
|---|---|---|---|
| 5,590,317 A * | 12/1996 | Iguchi | ..................... G06F 16/93 |
| 5,999,949 A | 12/1999 | Crandall | |
| 6,154,737 A | 11/2000 | Inaba et al. | |
| 9,002,843 B2 * | 4/2015 | Itoh | ..................... G06F 17/3053 |
| | | | 707/736 |
| 2002/0029206 A1 * | 3/2002 | Satoh | .................. H03M 7/3084 |
| 2002/0078062 A1 * | 6/2002 | Kataoka | ................ G06F 3/0608 |

(Continued)

FOREIGN PATENT DOCUMENTS

| | | |
|---|---|---|
| JP | 5-54077 | 3/1993 |
| JP | 6-348757 | 12/1994 |

(Continued)

OTHER PUBLICATIONS

Extended European Search Report dated Mar. 4, 2015 in corresponding European Patent Application No. 14177795.3.

(Continued)

*Primary Examiner* — Hicham Skhoun
(74) *Attorney, Agent, or Firm* — Staas & Halsey, LLP

(57) ABSTRACT

An information processing system includes a processor configured to create, when object data is compressed for each word in units of records, count data that indicates for each record of the object data, an appearance count of each word, the count data being added to the object data that has been compressed; and identify based on the count data, a second character string that corresponds to a first character string defined as a search condition for the object data.

9 Claims, 13 Drawing Sheets

(56) References Cited

U.S. PATENT DOCUMENTS

| | | | |
|---|---|---|---|
| 2004/0225497 A1 | 11/2004 | Callahan | |
| 2008/0098024 A1* | 4/2008 | Kataoka | G06F 16/90335 |
| 2009/0193020 A1* | 7/2009 | Kataoka | G06F 17/30985 |
| 2009/0299974 A1* | 12/2009 | Kataoka | G06F 17/30985 |
| 2010/0131476 A1* | 5/2010 | Kataoka | G06F 17/30979 707/693 |
| 2014/0059075 A1* | 2/2014 | Kataoka | G06F 16/13 707/769 |
| 2016/0006456 A1* | 1/2016 | Muramatsu | H03M 7/3084 707/693 |

FOREIGN PATENT DOCUMENTS

| | | |
|---|---|---|
| JP | 11-85764 | 3/1999 |
| JP | 11-161658 | 6/1999 |
| JP | 2002-230037 | 8/2002 |

OTHER PUBLICATIONS

European Office Action dated Feb. 21, 2017 in corresponding European Patent Application No. 14 177 795.3.
European Office Action dated Sep. 26, 2017 in corresponding European Patent Application No. 14177795.3.
European Decision to Refuse dated May 23, 2018 in related European Patent Application 14 177 795.3.

* cited by examiner

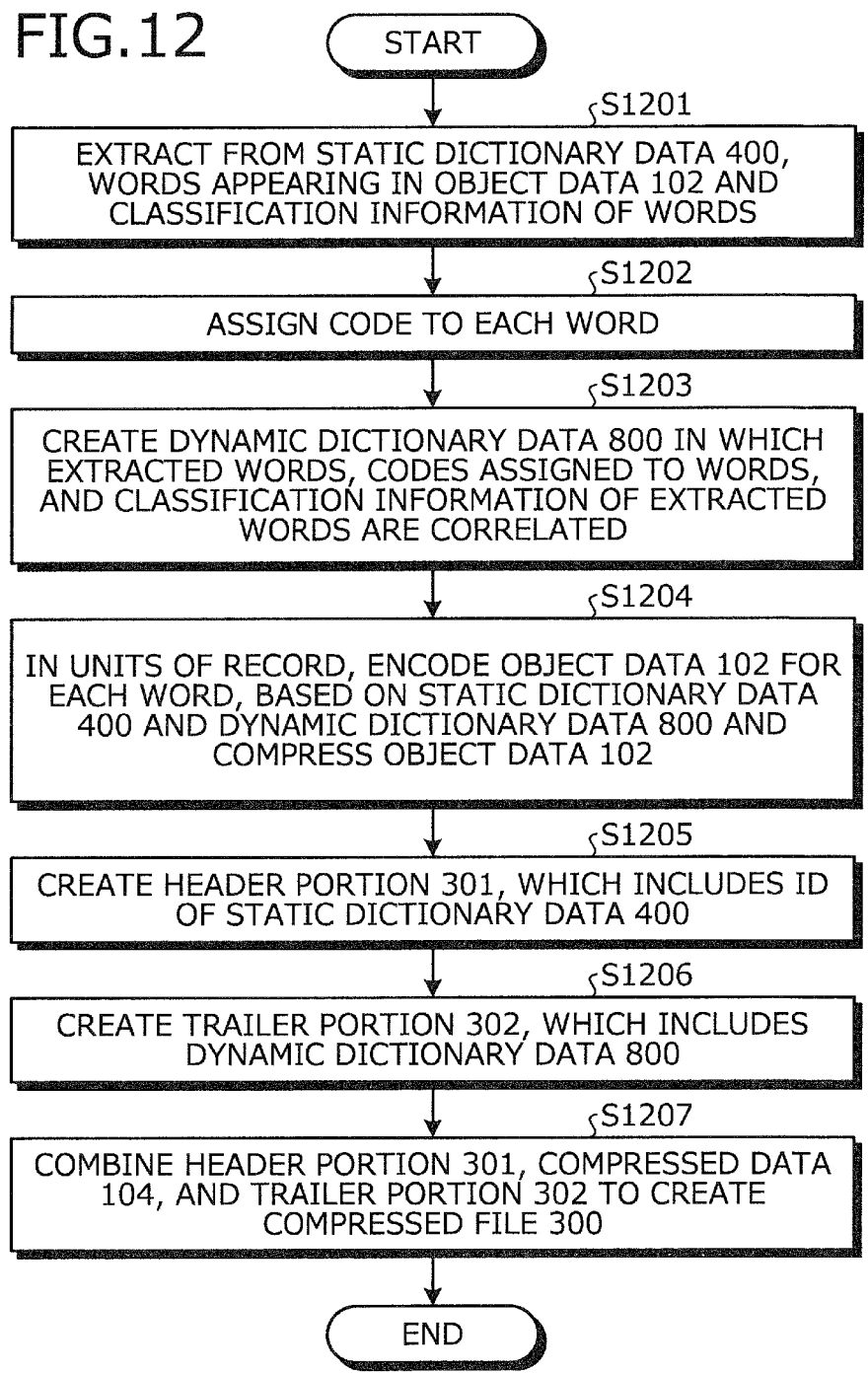

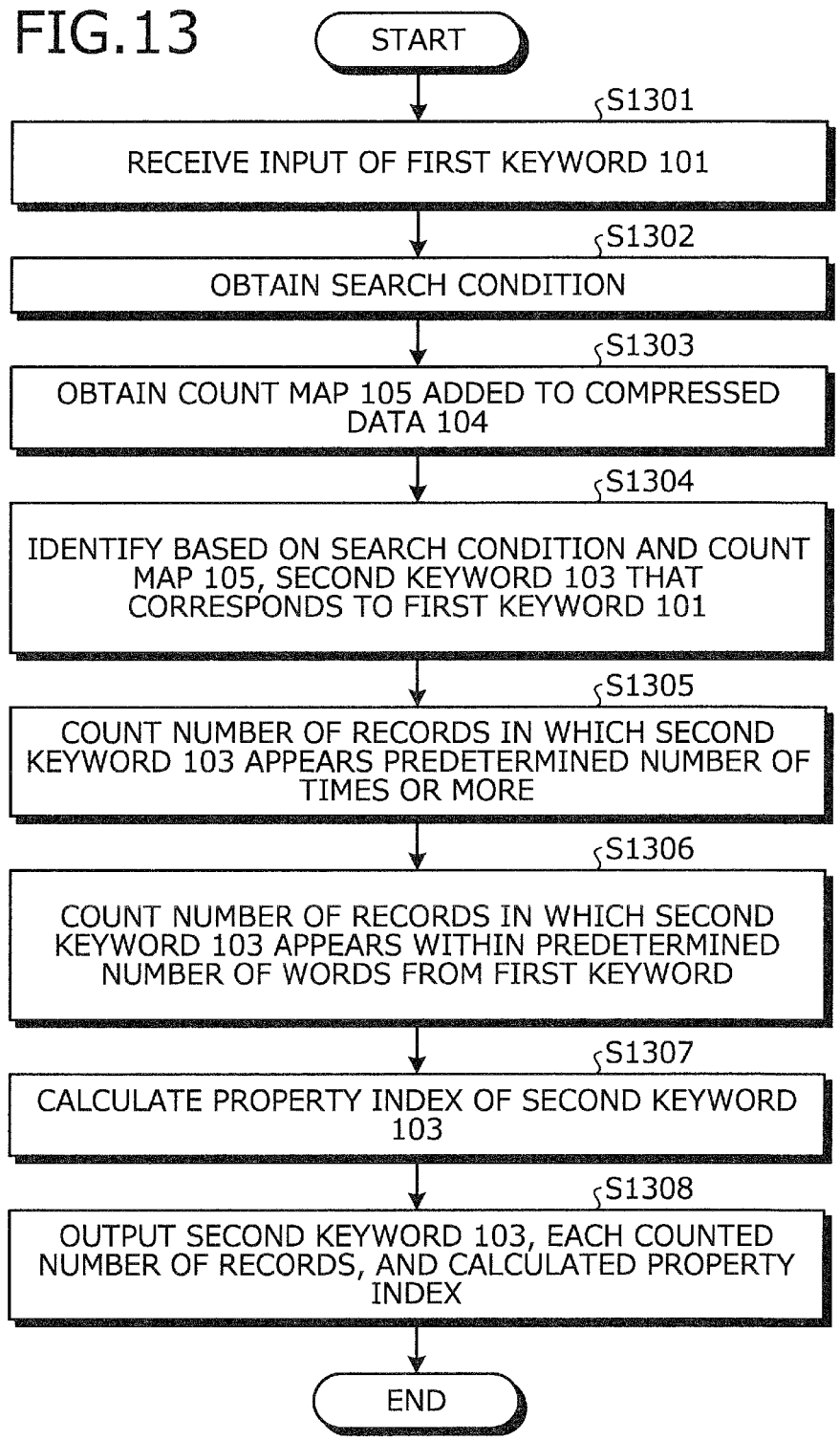

INFORMATION PROCESSING SYSTEM, INFORMATION PROCESSING METHOD, AND COMPUTER PRODUCT

CROSS REFERENCE TO RELATED APPLICATIONS

This application is based upon and claims the benefit of priority of the prior Japanese Patent Application No. 2013-157196, filed on Jul. 29, 2013, the entire contents of which are incorporated herein by reference.

FIELD

The embodiments discussed herein are related to an information processing system, an information processing method, and a computer product.

BACKGROUND

Conventionally, input of a keyword is received to identify and output from object data, another keyword that corresponds to the keyword. In a related technique, for example, if the number of corresponding documents is large when a document database is searched by a first search expression, one keyword is picked up from the first search expression and a co-occurrence database is searched to identify one or more narrowed-down candidate keywords. In this case, the co-occurrence database stores one keyword and a keyword co-occurring with the one keyword and the number of co-occurrences for a keyword extracted from all document files registered in the document database. For example, in an existing technique, after word division (morphological analysis) of text data, frequency detection eliminates repeats of words to create compressed text in which words are arranged in order of frequency. For examples of such techniques, refer to Japanese Laid-Open Patent Publication Nos. 2002-230037 and H6-348757.

Nonetheless, with the conventional techniques described above, if a related keyword of an input keyword is searched for (analyzed) by using a co-occurrence count and a keyword appearance count, a database of a sufficient size is prepared for sufficient analysis or for handling various input keywords. For example, as the data amount of object data increases in the case of big data etc., the size of the database also increases. On the other hand, if the size of the database is insufficient, since information of the co-occurrence count and the keyword appearance count is used in an incomplete range, the analysis becomes insufficient or only limited input keywords are handled.

SUMMARY

According to an aspect of an embodiment, an information processing system includes a processor configured to create, when object data is compressed for each word in units of records, count data that indicates for each record of the object data, an appearance count of each word, the count data being added to the object data that has been compressed; and identify based on the count data, a second character string that corresponds to a first character string defined as a search condition for the object data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a flowchart of an example of the compression process procedure of the information processing apparatus 100; and FIG. 13 is a flowchart of an example of the identification process procedure of the information processing apparatus 100.

DESCRIPTION OF EMBODIMENTS

Embodiments of an information processing system, an information processing method, and a computer product will be described in detail with reference to the accompanying drawings.

Figure 1:
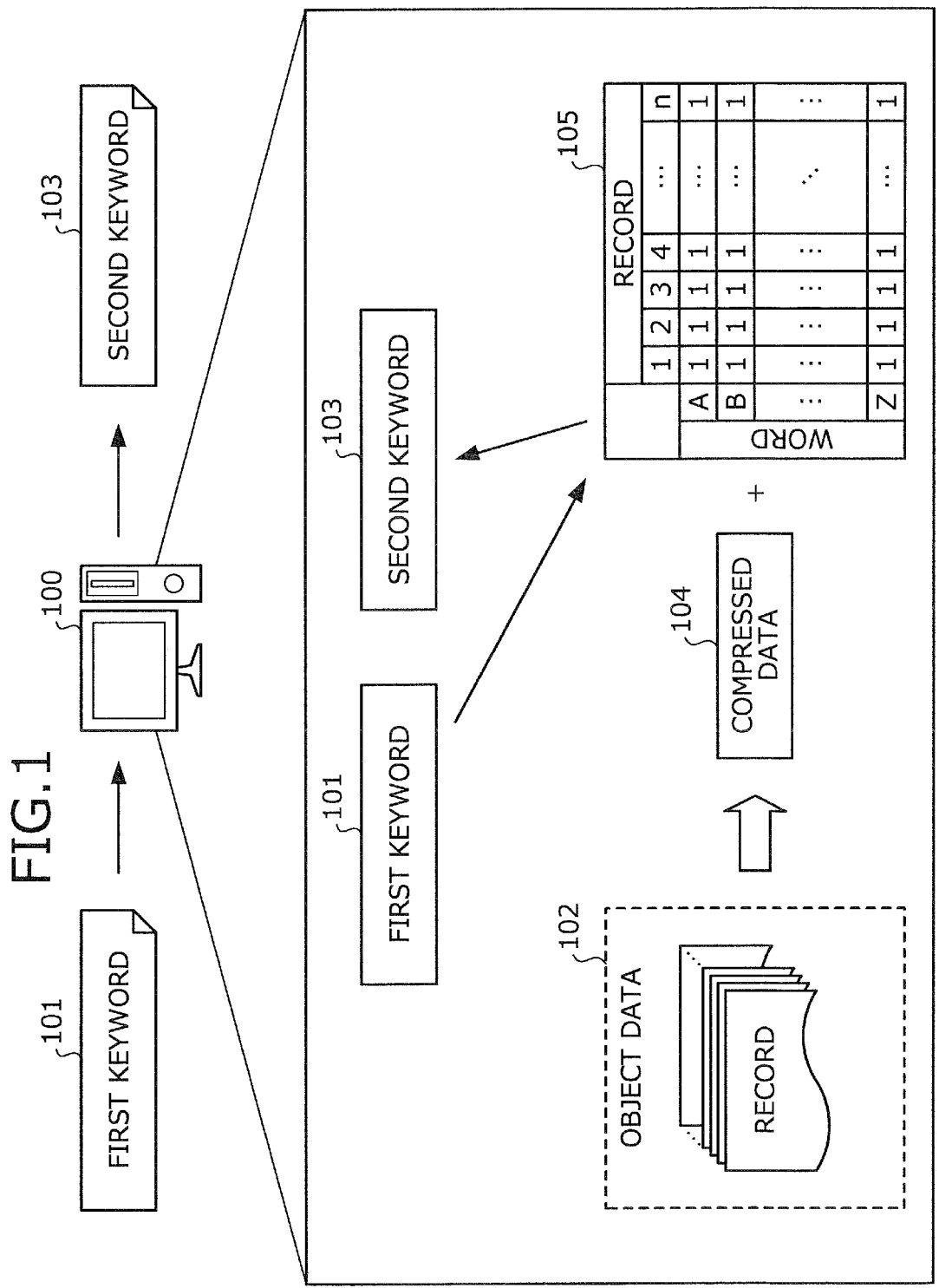
FIG. 1 is an explanatory view of an example of a keyword identification process in an information processing system.

FIG. 1 is an explanatory view of an example of a keyword identification process in the information processing system. In FIG. 1, the information processing system is implemented by an information processing apparatus 100.

The information processing apparatus 100 is a computer that receives input of a first keyword 101 to identify and output a second keyword 103 that corresponds to the first keyword 101 among keywords included in object data 102. The first keyword 101 is a word. The first keyword 101 may be a concatenated basic word. The first keyword 101 may be a character string.

The object data 102 is a document or a group of documents. The object data 102 is divided into multiple records. If the object data 102 is a document, a record is a section included in the document. If the object data 102 is a group of documents, a record is a document included in the group of documents. If the object data 102 includes multiple groups of documents, a record may be a group of documents.

The second keyword 103 is a word that corresponds to the first keyword 101. If the first keyword 101 is a concatenated basic word, the second keyword 103 may be a word that corresponds to the concatenated basic word or may be a word that corresponds to any word in the concatenated basic word. If the first keyword 101 is a character string, the second keyword 103 may be a word that corresponds to a word included in the character string. In the following description, the first keyword 101 and the second keyword 103 are assumed to be words, for simplicity of description.

In the example depicted in FIG. 1, in units of records, the information processing apparatus 100 compresses each word of the object data 102 and stores the data as compressed data 104. When compressing in units of records, each word of the object data 102, the information processing apparatus 100 creates and adds to the compressed data 104, a count map 105 that indicates according to record, the appearance count of each word. The information processing apparatus 100 stores the compressed data 104 and the count map 105 collectively as a compressed file.

When receiving the input of the first keyword 101, the information processing apparatus 100 identifies and outputs the second keyword 103 that corresponds to the first keyword 101, based on the count map 105. For example, the information processing apparatus 100 identifies and outputs as the second keyword 103, a keyword appearing a predetermined number of times or more together with the first keyword 101 in a record in which the first keyword 101 appears.

As a result, the information processing apparatus 100 can identify the second keyword 103 corresponding to the first keyword 101 without decompressing the compressed data 104 and can handle various keywords. The information processing apparatus 100 can identify the second keyword 103 without decompressing the compressed data 104 and can make the identification process of the second keyword 103 more efficient.

The information processing apparatus 100 can identify the second keyword 103 without decompressing the compressed data 104 and can execute the identification process of the second keyword 103 even if the size of a storage apparatus is limited. By creating information (such as the count map 105 used in the analysis of the object data 102) when the object data 102 is compressed, the information processing apparatus 100 can reduce the period from the input of the first keyword 101 until the second keyword 103 is identified.

By adding the count map 105 to the compressed data 104, the information processing apparatus 100 can easily manage the compressed data 104 and the count map 105 in a correlated manner. By adding the count map 105 to the compressed data 104, the information processing apparatus 100 can reduce the size of a storage area used for the compressed data 104 and the count map 105 as compared to a case of separately managing the compressed data 104 and the count map 105.

When compressing the object data 102 for each word, in units of records, the information processing apparatus 100 may create and add to the compressed data 104, classification information that indicates the type of each word. When receiving the input of the first keyword 101, the information processing apparatus 100 may identify and output the second keyword 103 that corresponds to the first keyword 101, among keywords of a predetermined type and based on the count map 105 and the classification information. This enables the information processing apparatus 100 to supply to the user who input the first keyword 101, a second keyword 103 identified for each word type as analysis support data. As a result, the user can analyze each second keyword 103 based on the output result.

The information processing apparatus 100 may output the number of records in which the second keyword 103 appears, together with the second keyword 103. This enables the information processing apparatus 100 to supply to the user, the number of records in which the second keyword 103 appears, as analysis support data. As a result, the user can analyze the second keyword 103 based on the output result.

The information processing apparatus 100 may output the number of records in which the second keyword 103 appears within a predetermined number of words from the first keyword 101, together with the second keyword 103. This enables the information processing apparatus 100 to supply to the user, the number of records in which the second keyword 103 appears within the predetermined number of words from the first keyword 101, as analysis support data. As a result, the user can analyze the second keyword 103 based on the output result.

The information processing apparatus 100 may output the number of records in which the second keyword 103 appears a predetermined number of times or more, together with the second keyword 103. This enables the information processing apparatus 100 to supply to the user, the number of records in which the second keyword 103 appears a predetermined number of times or more, as analysis support data. As a result, the user can analyze the second keyword 103 based on the output result.

The information processing apparatus 100 may compress the object data 102 by using static dictionary data and may add the static dictionary data and the count map 105 to the compressed data 104. If a computer that decompresses the compressed data 104 also has the static dictionary data used for the compression, the information processing apparatus 100 may add the ID of the static dictionary data and the count map 105 to the compressed data 104.

The information processing apparatus 100 may extract from the static dictionary data, information concerning a word included in both the object data 102 and the static dictionary data to create dynamic dictionary data and may compress the object data 102 by using the dynamic dictionary data. In this case, the information processing apparatus 100 adds the dynamic dictionary data and the count map 105 to the compressed data 104. This enables the information processing apparatus 100 to reduce the amount of data as compared to a case of adding the static dictionary data.

As described, for example, when a given electronic book is displayed among a group of electronic books, if the user selects a keyword included in the electronic book, the information processing apparatus 100 can search for a related keyword from the group of electronic books at high speed. The information processing apparatus 100 can output in a ranking format according to the number of keywords, the number of books that include the search keyword to support the keyword analysis work of the user.

Although the information processing system is implemented by one apparatus in the example depicted in FIG. 1, configuration is not limited hereto. For example, the information processing system may be implemented by multiple apparatuses. For example, the information processing system may be implemented by an apparatus that compresses the object data 102 and creates and adds the count map 105, and an apparatus that receives the first keyword 101 and identifies and outputs the second keyword 103.

Although the object data 102 is one data in the example of FIG. 1, configuration is not limited hereto. For example, the information processing apparatus 100 may identify the second keyword 103 corresponding to the first keyword 101 in each object data 102 among plural object data 102 and may integrate and output the identified second keywords 103. The information processing apparatus 100 may count the number records that include the second keyword 103 in each object data 102 and may integrate and output the counted numbers.

Figure 2:
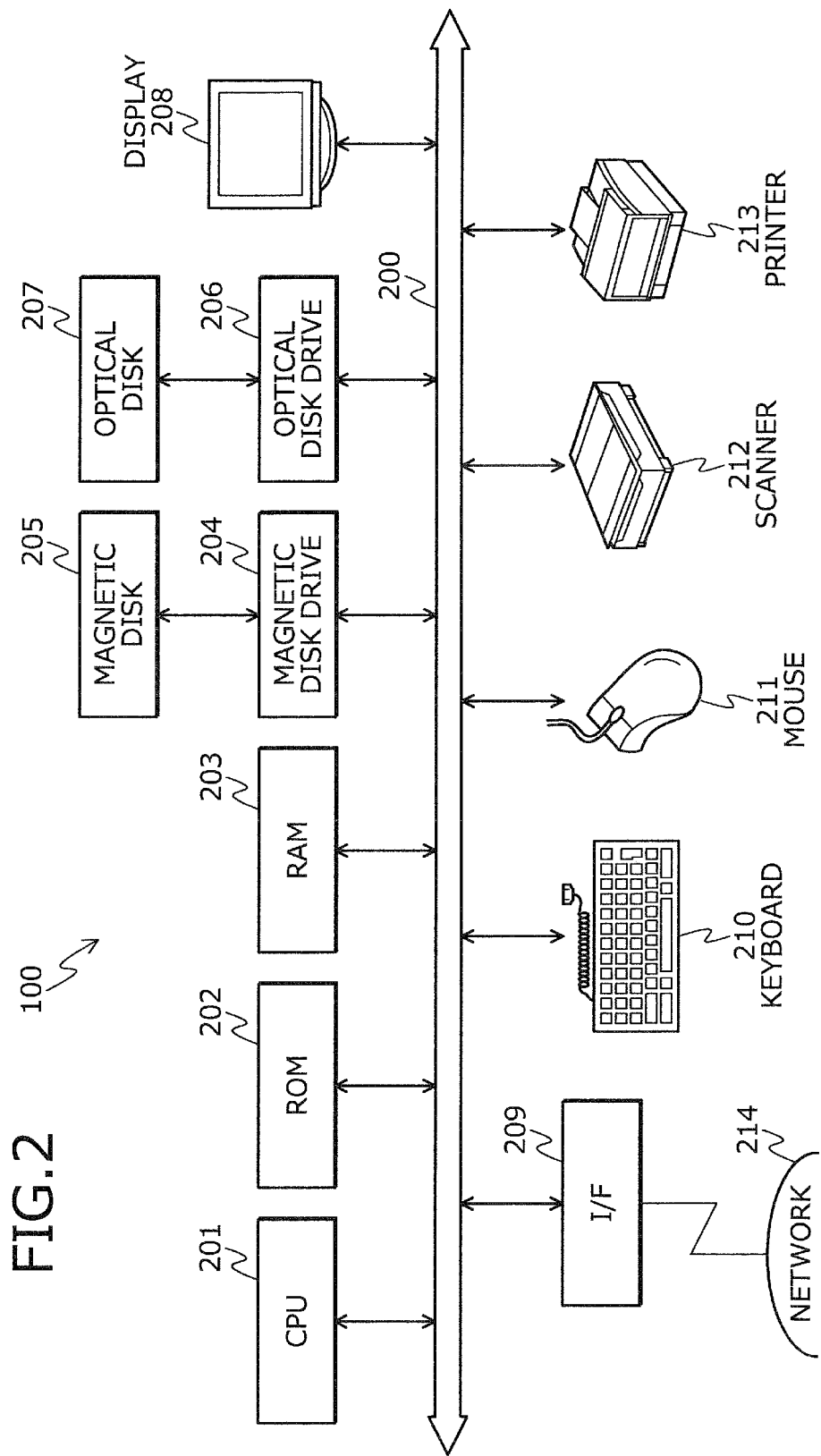
FIG. 2 is a block diagram of a hardware configuration of an information processing apparatus 100 according to an embodiment.

FIG. 2 is a block diagram of a hardware configuration of the information processing apparatus 100 according to an embodiment. As depicted in FIG. 2, the information processing apparatus 100 includes a central processing unit (CPU) 201, read-only memory (ROM) 202, random access memory (RAM) 203, a magnetic disk drive 204, a magnetic disk 205, an optical disk drive 206, an optical disk 207, a display 208, an interface (I/F) 209, a keyboard 210, a mouse 211, a scanner 212, and a printer 213, respectively connected by a bus 200.

The CPU 201 governs overall control of the information processing apparatus 100. The ROM 202 stores therein programs such as a boot program. The RAM 203 is used as a work area of the CPU 201. The magnetic disk drive 204, under the control of the CPU 201, controls the reading and writing of data with respect to the magnetic disk 205. The magnetic disk 205 stores therein data written under control of the magnetic disk drive 204.

The optical disk drive 206, under the control of the CPU 201, controls the reading and writing of data with respect to the optical disk 207. The optical disk 207 stores therein data written under control of the optical disk drive 206, the data being read by a computer.

The display 208 displays, for example, data such as text, images, functional information, etc., in addition to a cursor, icons, and/or tool boxes. A liquid crystal display, a plasma display, etc., may be employed as the display 208.

The I/F 209 is connected to a network 214 such as a local area network (LAN), a wide area network (WAN), and the Internet through a communication line and is connected to other apparatuses through the network 214. The I/F 209 administers an internal interface with the network 214 and controls the input and output of data with respect to external apparatuses. For example, a modem or a LAN adaptor may be employed as the I/F 209.

The keyboard 210 includes, for example, keys for inputting letters, numerals, and various instructions and performs the input of data. Alternatively, a touch-panel-type input pad or numeric keypad, etc. may be adopted. The mouse 211 is used to move the cursor, select a region, or move and change the size of windows. A track ball or a joy stick may be adopted provided each respectively has a function similar to a pointing device.

The scanner 212 optically reads an image and takes in the image data into the information processing apparatus 100. The scanner 212 may have an optical character reader (OCR) function as well. The printer 213 prints image data and text data. The printer 213 may be, for example, a laser printer or an ink jet printer. Further, at least any one among the optical disk drive 206, the optical disk 207, the display 208, the keyboard 210, the mouse 211, the scanner 212, and the printer 213 may be omitted.

An example of the data structure of a compressed file 300 that includes the compressed data 104 and the count map 105 will be described with reference to FIG. 3. The compressed file 300 is stored in a storage area such as the RAM 230, the magnetic disk 205, and the optical disk 207 depicted in FIG. 2, for example.

Figure 3:
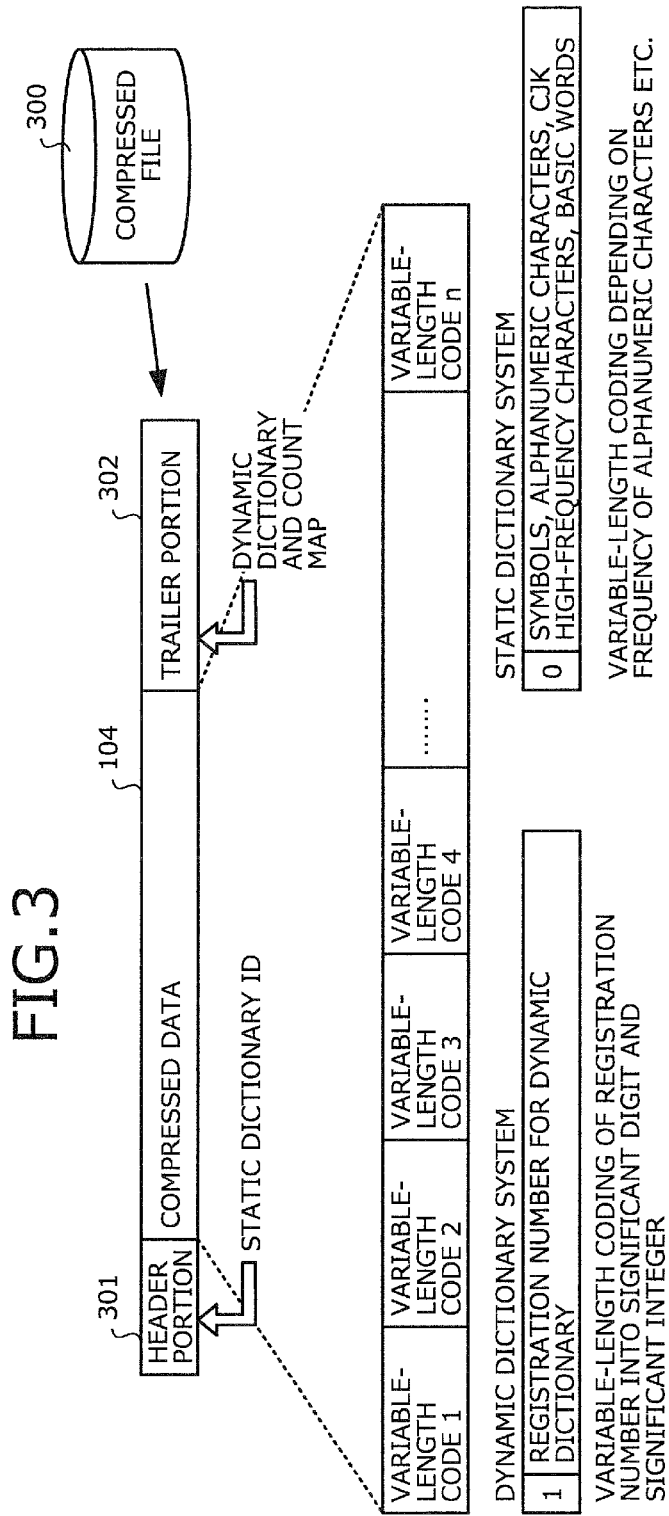
FIG. 3 is an explanatory view of an example of a data structure of a compressed file 300.

FIG. 3 is an explanatory view of an example of the data structure of the compressed file 300. As depicted in FIG. 3, the compressed file 300 includes a header portion 301, compressed data 104, and a trailer portion 302.

The header portion 301 stores an identifier of static dictionary data used for compression of the object data 102. The header portion 301 may store the static dictionary data used for compression of the object data 102. If dynamic dictionary data is used for compression of the object data 102, the trailer portion 302 stores the dynamic dictionary data used for compression of the object data 102. The trailer portion 302 stores the count map 105.

The compressed data 104 is data obtained when the object data 102 is compressed in units of words by using a variable-length coding mode. In other words, the compressed data 104 is data that includes a group of variable-length code obtained by compressing words. The compressed data 104 may include a portion compressed in units other than words and may include an uncompressed portion.

If a compression source word is included in the dynamic dictionary data, the variable-length code obtained by compressing a word is code obtained by encoding a registration number of the compression source word for the dynamic dictionary data. For example, the registration number for the dynamic dictionary data is encoded into a significant digit and a significant integer. If a compression source word is included in the static dictionary data, the variable-length code obtained by compressing a word is code stored in the static dictionary data and correlated with the compression source word. For example, code stored in the static dictionary data is encoded with short code assigned in descending order of word appearance frequency.

An example of the data structure of static dictionary data 400 will be described with reference to FIG. 4. The static dictionary data 400 is data used for compressing the object data 102 and decompressing the compressed data 104. The static dictionary data 400 is stored in a storage area such as the RAM 230, the magnetic disk 205, and the optical disk 207 depicted in FIG. 2, for example.

Figure 4:
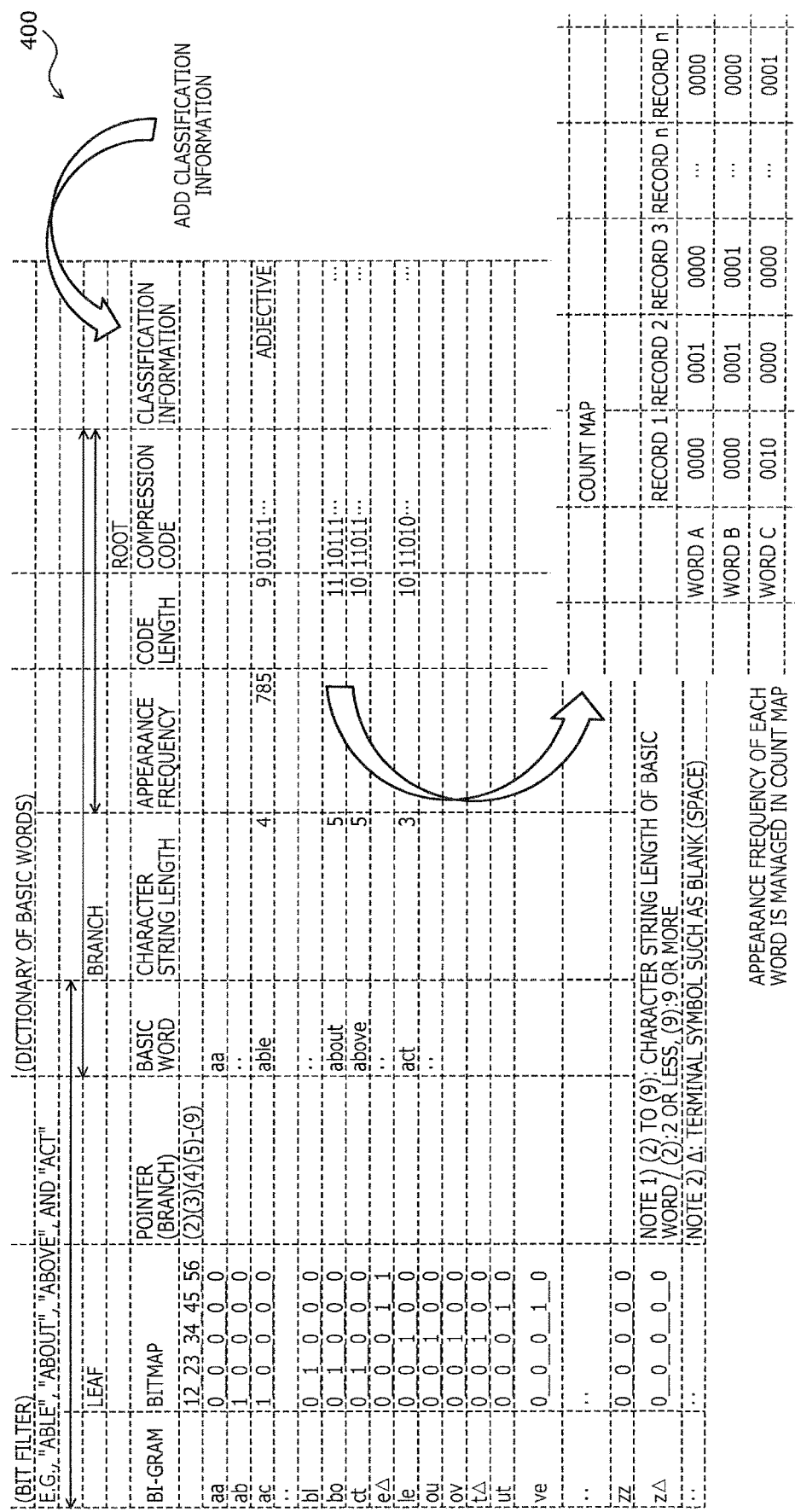
FIG. 4 is an explanatory view of an example of a data structure of static dictionary data 400.

FIG. 4 is an explanatory view of an example of the data structure of the static dictionary data 400. In FIG. 4, the static dictionary data 400 has a character string length field, an appearance frequency field, a code length field, a compression code field, and a classification information field correlated with a basic word field, as dictionary information. The basic word field stores a basic word to be encoded. The character string length field stores a character string length of the basic word. The appearance frequency field stores the number of times the basic word appears in the object data 102. The code length field stores a code length of code that corresponds to the basic word. The compression code field stores code that corresponds to the basic word. The classification information field stores classification information that indicates the type of the basic word.

In the example depicted in FIG. 4, the static dictionary data 400 stores the character string length "4", the appearance frequency "785", the code length "9", the code "01011 . . . ", and the classification information "adjective" correlated with the basic word "able".

The static dictionary data 400 has a bitmap field and a pointer field correlated with a bi-gram field, as filter information. The bi-gram field stores a character string that is obtained by concatenating two characters and makes up a portion of a word stored in the basic word field. The bitmap field stores data that indicates to which character number portion of the word stored in the basic word field, the character string obtained by concatenating two characters corresponds. The pointer field stores for each word character count, a pointer that indicates the location of the basic word field storing a word that includes at the beginning portion, the character string obtained by concatenating the two characters stored in the bi-gram field.

In the example of FIG. 4, the static dictionary data 400 stores the basic word "able". Therefore, the static dictionary data 400 stores a bitmap "1_0_0_0_0" indicating that a character string is included at the first and second characters of the basic word "able", correlated with a character string "ab" obtained by concatenating two characters. The static dictionary data 400 correlates and stores the concatenated character string "ab" and a pointer that indicates the location of the basic word field storing the four-character word "able" that includes the character string "ab" at the beginning portion.

The static dictionary data 400 is combined with the count map 105 when the information processing apparatus 100 compresses the object data 102. The count map 105 stores mapping data that indicates the appearance count in units of basic words, for each record.

Although the static dictionary data 400 stores alphabet characters in the example depicted in FIG. 4, configuration is not limited hereto. For example, the static dictionary data 400 may store hiragana and kanji characters other than alphabet characters. Although the static dictionary data 400 stores code corresponding to a basic word in the example of FIG. 4, configuration is not limited hereto. For example, the static dictionary data 400 may store information that indicates the location at which a basic word first appears in the object data 102.

The static dictionary data 400 may be data that stores basic words having higher appearance frequencies in general documents, for example. The static dictionary data 400 may be data that stores technical words having higher appearance frequencies only in a particular field, for example. The static dictionary data 400 may be data that stores concatenated basic words obtained by combining basic words.

The object data 102 may be compressed by using dynamic dictionary data obtained by extracting from the static dictionary data 400, only the information concerning words appearing in the object data 102, for example. The object data 102 may be compressed by using the static dictionary data 400 that store basic words and the dynamic dictionary data obtained by extracting from the static dictionary data 400 that stores concatenated basic words, only the information concerning words appearing in the object data 102, for example.

An example of the data structure of the count map 105 will be described with reference to FIG. 5. The count map 105 is stored in a storage area such as the RAM 230, the magnetic disk 205, and the optical disk 207 depicted in FIG. 2, for example.

Figure 5:
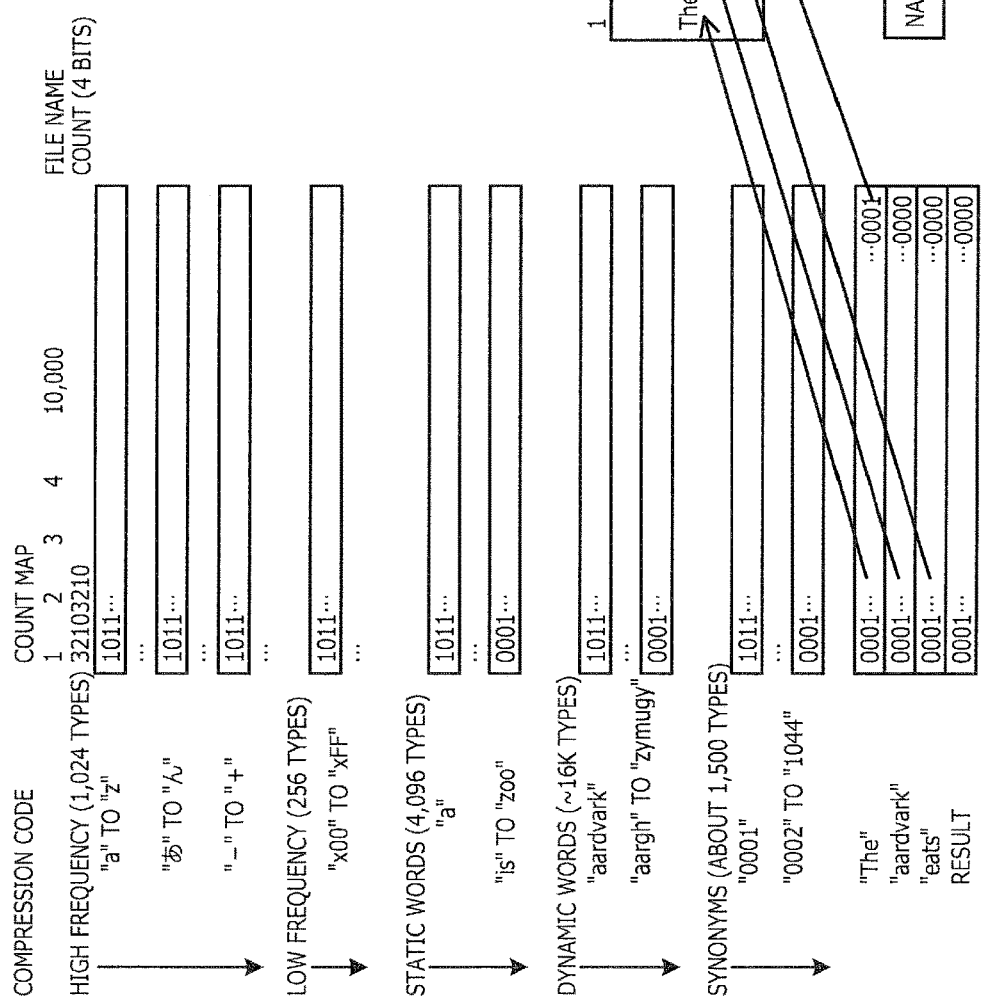
FIG. 5 is an explanatory view of an example of a data structure of a count map 105.

FIG. 5 is an explanatory view of an example of the data structure of the count map 105. As depicted in FIG. 5, the count map 105 includes words and mapping data correlated with each word and indicating the appearance count for each record.

For example, the mapping data is data obtained by assigning four-bit data to each record to represent the appearance count for each record by using a binary number. In the example of FIG. 5, data "1011" of the leading four bits of the mapping data correlated with a word "a" represents the appearance count "11" of the word "a" in a record 1.

The information processing apparatus 100 can identify a second keyword 103 that appears a predetermined number of times or more in the same record together with the first keyword 101, by referring to the count map 105. The information processing apparatus 100 can identify a record in which both the first keyword 101 and the second keyword 103 appear, by referring to the count map 105. For example, the information processing apparatus 100 can identify the second keyword 103 that appears a predetermined number of times or more in the same record together with the first keyword 101, based on the appearance count of each keyword in a record in which the appearance count of the first keyword 101 is one or more.

An example of the data structure of the dynamic dictionary data will be described. The dynamic dictionary data is obtained by extracting from the static dictionary data 400, only the information concerning words appearing in the object data 102 and is data used for compressing the object data 102 and decompressing the compressed data 104. The dynamic dictionary data is stored in a storage area such as the RAM 230, the magnetic disk 205, and the optical disk 207 depicted in FIG. 2, for example.

As is the case with the static dictionary data 400, the dynamic dictionary data has a character string length field, an appearance frequency field, a code length field, a compression code field, and a classification information field correlated with a basic word field, as dictionary information. The basic word field stores a concatenated basic word or a technical word, etc. to be encoded. The character string length field stores a character string length of the concatenated basic word, etc. The appearance frequency field stores the appearance count of the concatenated basic word, etc. in the object data 102. The code length field stores the code length of code corresponding to the concatenated basic word, etc. The compression code field stores code that corresponds to the concatenated basic word, etc. The classification information field stores classification information that indicates the type of the concatenated basic word, etc.

As is the case with the static dictionary data 400, the dynamic dictionary data has a bitmap field and a pointer field correlated with a bi-gram field, as filter information. The bi-gram field stores a character string obtained by concatenating two characters and making up a portion of the word stored in the basic word field. The bitmap field stores data that indicates to which character number portion of the word stored in the basic word field, the character string obtained by concatenating the two characters corresponds. The pointer field stores for each word character count, a pointer that indicates the location of the basic word field storing a word that includes at the beginning portion the character string obtained by concatenating the two characters stored in the bi-gram field.

As is the case with the static dictionary data 400, the dynamic dictionary data is combined with the count map 105 when the information processing apparatus 100 compresses the object data 102. The count map 105 stores mapping data that indicates the appearance count in units of concatenated basic words, for each record.

Figure 6:
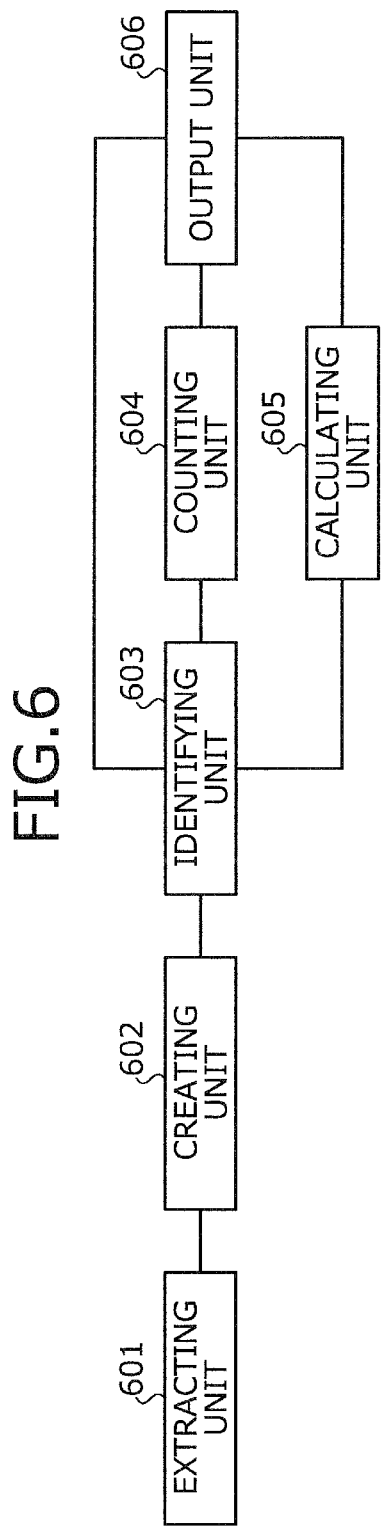
FIG. 6 is a block diagram of a functional configuration example of the information processing system.

A functional configuration example of the information processing system will be described with reference to FIG. 6. FIG. 6 is a block diagram of a functional configuration example of the information processing system. The information processing system includes an extracting unit 601, a creating unit 602, an identifying unit 603, a counting unit 604, a calculating unit 605, and an output unit 606.

For example, functions of extracting unit 601, the creating unit 602, the identifying unit 603, the counting unit 604, the calculating unit 605, and the output unit 606 are implemented by causing the CPU 201 to execute programs stored in a storage device such as the ROM 202, the RAM 203, the magnetic disk 205, and the optical disk 207 depicted in FIG. 2, or by the I/F 209.

The information processing apparatus 100 can perform operation of creating and adding the count map 105 to the compressed data 104 based on the object data 102. In the following description, the operation of creating and adding the count map 105 to the compressed data 104 may be referred to as "first operation". The information processing apparatus 100 can perform operation of identifying the second keyword 103. In the following description, the operation of identifying the second keyword 103 may be referred to as "second operation".

The first operation will be described. The first operation is the operation of creating and adding the count map 105 to the compressed data 104. The first operation is implemented by the extracting unit 601 and the creating unit 602.

The extracting unit 601 extracts from the object data 102, words identical to words included in a predetermined word group. The object data 102 is a document or a group of documents. The object data 102 is divided into multiple records. If the object data 102 is a document, a record is a section included in the document. If the object data 102 is a group of documents, a record is a document included in the group of documents. The predetermined word group is a word group stored in the static dictionary data 400, as an object to be encoded.

For example, the extracting unit 601 extracts a word included in the object data 102 and identical to a word included in a word group stored in the static dictionary data 400. The static dictionary data 400 is data that stores words and code obtained by encoding the words in a correlated manner. As a result, the extracting unit 601 can extract a word to be encoded. The extracted data is stored to a storage area such as the RAM 230, the magnetic disk 205, and the optical disk 207, for example.

When the object data 102 is compressed for each word in units of records, the creating unit 602 creates count data that indicates the appearance count of each word, according to each record of the object data 102 and adds the count data to the compressed data 104 obtained by compressing the object data 102. The count data is the count map 105 described above. For example, the creating unit 602 replaces a word included in the object data 102 with code based on the static dictionary data 400 and thereby, creates the compressed data 104. In this case, the creating unit 602 counts the appearance count of the word replaced with the code to create and add the count map 105 to the compressed data 104. As a result, when the object data 102 is compressed, the creating unit 602 can create the count map 105 that stores the appearance counts of the respective words included in the static dictionary data 400 used for identification of a keyword and can store the count map 105 together with the compressed data 104.

When the object data 102 is compressed for each word in units of records, the creating unit 602 may create count data that indicates the appearance count on the basis of a word extracted by the extracting unit 601 for each record of the object data 102. The creating unit 602 may add the created count data to the compressed data 104 obtained by compressing the object data 102. For example, the creating unit 602 replaces a word included in the object data 102 with a code based on the dynamic dictionary data to create the compressed data 104. In this case, the creating unit 602 counts the appearance count of the word replaced with the code to create and add the count map 105 to the compressed data 104. As a result, when the object data 102 is compressed, the creating unit 602 can create the count map 105 storing the appearance counts of the respective words included in the dynamic dictionary data used for identification of a keyword and can store the count map 105 together with the compressed data 104.

The creating unit 602 may create and add to the compressed data 104, classification data that indicates the type of each word. For example, if the type of a word is stored correlated with each word in the static dictionary data 400, the creating unit 602 creates classification data that stores the type of each word replaced with code based on the static dictionary data 400 and adds the classification data to the compressed data 104. As a result, when the object data 102 is compressed, the creating unit 602 can create the classification data used for identification of a keyword and can store the classification data together with the compressed data 104.

The creating unit 602 may create and add code data that indicates a compression result of each word to the compressed data 104. For example, the creating unit 602 may add the static dictionary data 400 to the compressed data 104. The creating unit 602 may be configured to add to the compressed data 104, only the portions of the basic word field, the compression code field, and the classification information field of the static dictionary data 400.

The creating unit 602 may create dynamic dictionary data that stores words identical to the words of the static dictionary data 400 and extracted by the extracting unit 601, and the creating unit 602 may add the dynamic dictionary data to the compressed data 104. The creating unit 602 may be configured to add only the portions of the basic word field, the compression code field, and the classification information field of the dynamic dictionary data to the compressed data 104.

As a result, the creating unit 602 can store the static dictionary data 400 and the dynamic dictionary data used for decompression of the compressed data 104 together with the compressed data 104. The created data is stored in a storage area such as the RAM 230, the magnetic disk 205, and the optical disk 207, for example.

The second operation will be described. The second operation is an operation of identifying the second keyword 103. The second operation is implemented by the identifying unit 603, the counting unit 604, the calculating unit 605, and the output unit 606.

The identifying unit 603 identifies based on the count data added to the compressed data 104, a second character string that corresponds to a first character string defined as a search condition for the object data 102. The first character string is a keyword input by the user of the information processing apparatus 100. The identifying unit 603 receives input of the first keyword 101, for example. The identifying unit 603 then obtains the count map 105 from the compressed file 300.

The identifying unit 603 identifies based on the obtained count map 105, a second keyword 103 that appears a predetermined number of times or more in the same record together with the first keyword 101. The identifying unit 603 may identify based on the obtained count map 105, a second keyword 103 co-occurring with the first keyword 101.

As a result, the identifying unit 603 can identify a second keyword 103 that corresponds to the first keyword 101 without decompressing the compressed data 104 and can handle various keywords.

The identifying unit 603 may identify based on the count data and the classification data added to the compressed data 104, a second character string that corresponds to a classification and the first character string defined as search conditions for the object data 102. The identifying unit 603 receives from the user of the information processing apparatus 100, input of a given type defined as a search condition, for example. The identifying unit 603 then identifies among keywords of the given type and based on the count map 105 and the classification data, a second keyword 103 appearing the predetermined number of times or more in the same record together with the first keyword 101.

The identifying unit 603 may identify among keywords of the given type and based on the count map 105 and the classification data, a second keyword 103 co-occurring with the first keyword 101. As a result, the identifying unit 603 can supply to the user, a second keyword 103 identified for each type of word, as analysis support data.

The counting unit 604 counts in the object data 120, the number of records that include the second character string identified by the identifying unit 603. The counting unit 604 counts the number of records that include the second keyword 103 in the object data 120, based on the count map 105, for example. As a result, the counting unit 604 can supply to the user, the number of records in which the second keyword 103 appears, as analysis support data.

The counting unit 604 counts the number of records in which the second character string identified by the identifying unit 603 appears within a predetermined number of words from the first character string in the object data 120, based on the compressed data 104 and the dictionary data added to the compressed data 104. For example, the counting unit 604 identifies a first code corresponding to the first keyword 101 and a second code corresponding to the second keyword 103 based on the static dictionary data 400 and the dynamic dictionary data. The counting unit 604 counts the number of records in which the second code appears within a predetermined number of words from the first code. As a result, the counting unit 604 can supply to the user, the number of records in which the second keyword 103 co-occurs and appears with the first keyword 101, as analysis support data.

The counting unit 604 counts based on the count data added to the compressed data 104, the number of records in which the second character string identified by the identifying unit 603 appears a predetermined number of times or more in the object data 120. For example, the counting unit 604 counts the number of records in which the second keyword 103 appears a predetermined number of times or more in the object data 120, based on the count map 105. As a result, the counting unit 604 can supply to the user, the number of records in which the second keyword 103 appears a predetermined number of times or more, as analysis support data.

The calculating unit 605 calculates the significance of the second character string, based on the count data added to the compressed data 104. For example, the calculating unit 605 calculates TF-IDF for the second keyword 103, based on the count map 105. Calculation results are stored to a storage area such as the RAM 230, the magnetic disk 205, and the optical disk 207, for example. As a result, the calculating unit 605 can supply to the user, a property index of the second keyword 103, as analysis support data.

The output unit 606 outputs the second keyword 103 identified by the identifying unit 603. The output unit 606 may correlate and output the second keyword 103 identified by the identifying unit 603 and the number of records counted by the counting unit 604. The output unit 606 may correlate and output the second keyword 103 identified by the identifying unit 603 and the significance of the second keyword 103 calculated by the calculating unit 605. Forms of output include, for example, display on the display 208, print out at the printer 213, and transmission through the I/F 209 to an external apparatus. The form of output may be storage to a storage area such as the RAM 203, the magnetic disk 205, and the optical disk 207.

An example of a compression process of the information processing apparatus 100 will be described with reference to FIGS. 7 and 8.

Figure 7:
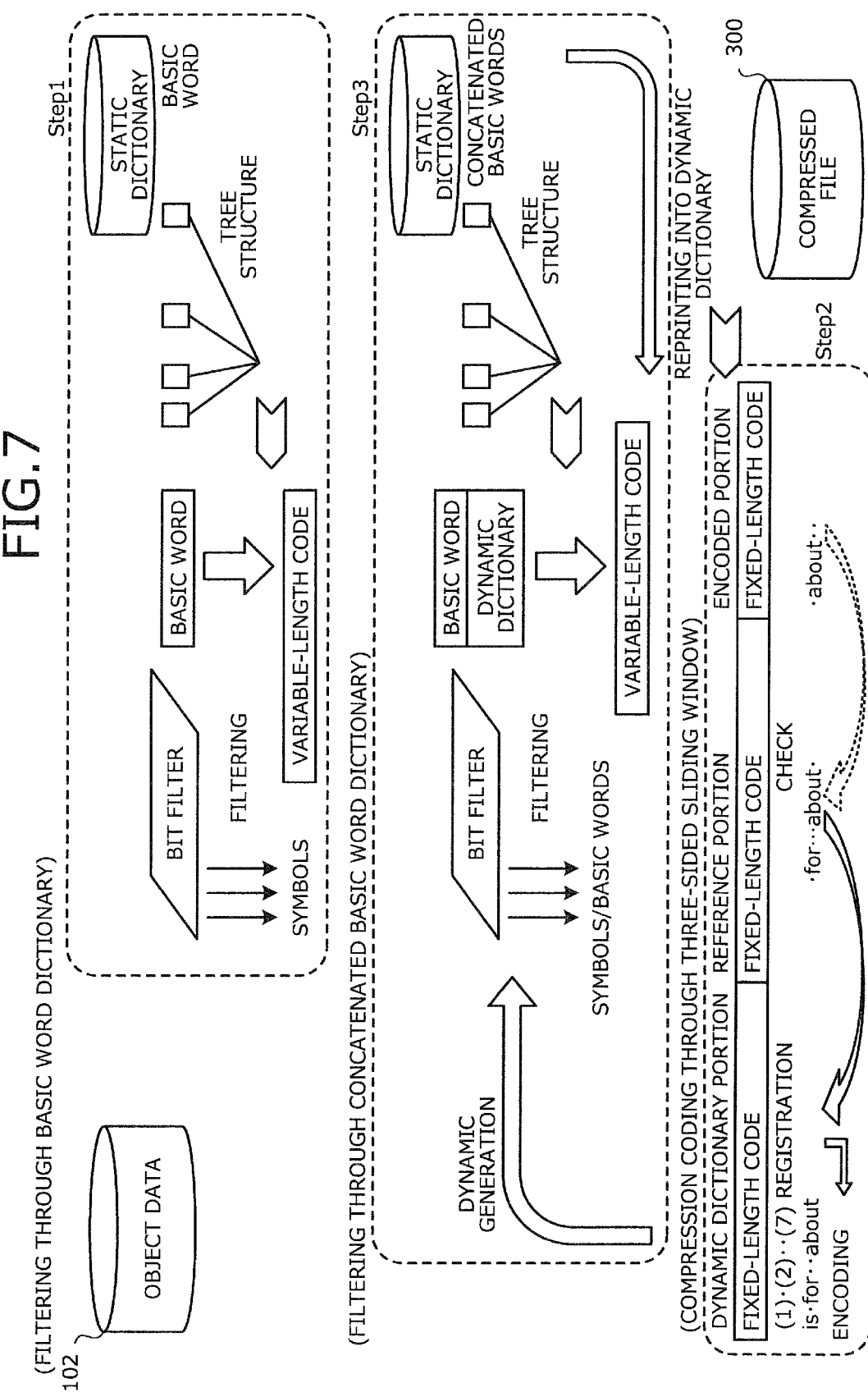
FIGS. 7 and 8 are explanatory views of an example of a compression process of the information processing apparatus 100.
Figure 8:
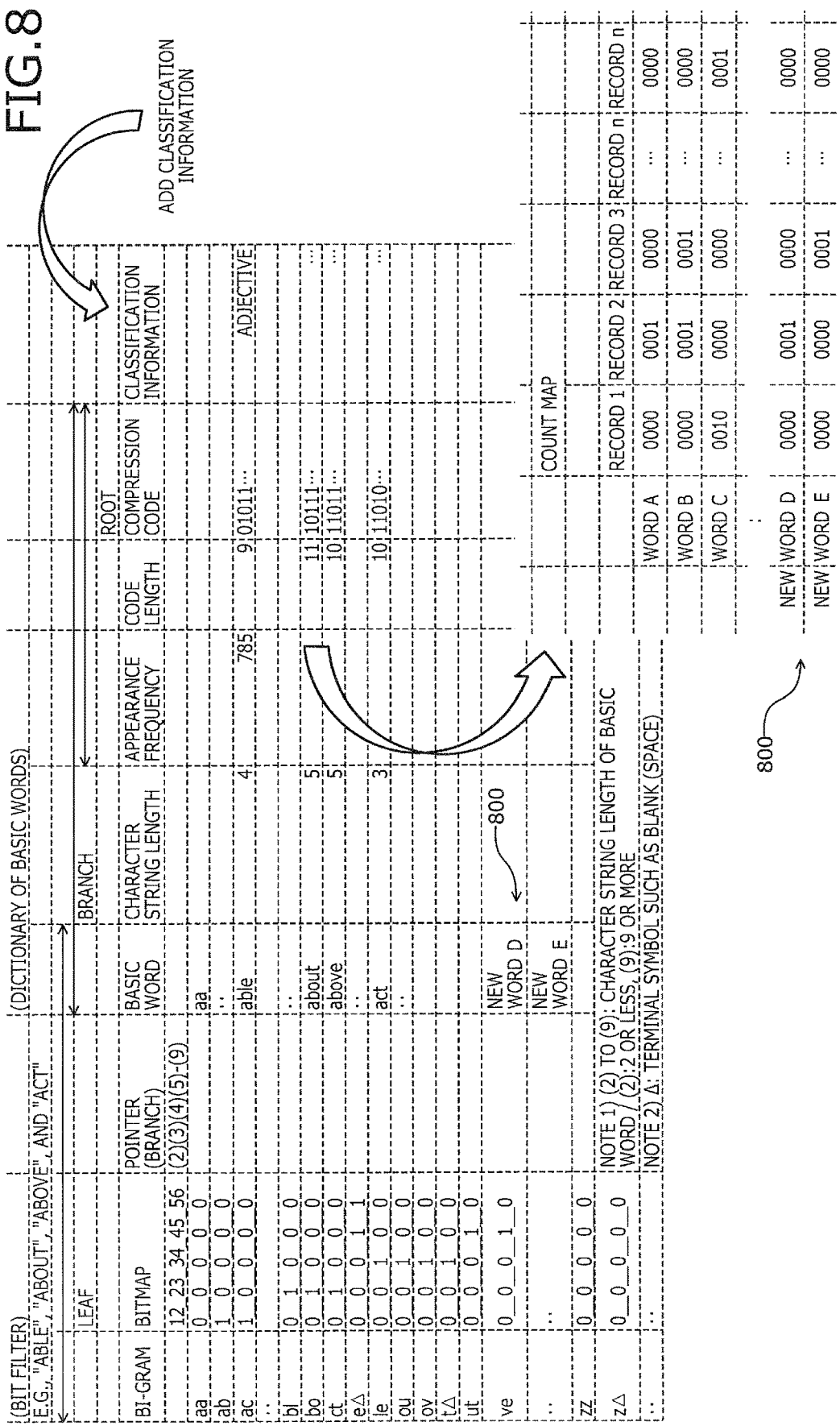

FIGS. 7 and 8 are explanatory views of an example of a compression process of the information processing apparatus 100. As depicted in FIG. 7, the information processing apparatus 100 uses as a bit filter, the filter information in the static dictionary data 400 for basic words having a tree structure to remove symbols from the object date 102 and to compress the basic words in the object date 102, for each record. The bit filter is a conventional technique and will not be described.

The information processing apparatus 100 then uses as a bit filter, the filter information in the static dictionary data 400 for concatenated basic words having a tree structure to remove symbols and basic words from the object data and to create the dynamic dictionary data for the concatenated basic words in the object data 102. The information processing apparatus 100 compresses the object date 102 for each word in units of records by using a three-sided sliding window based on the dynamic dictionary data. The three-sided sliding window is a conventional technique and will not be described. As a result, the information processing apparatus 100 can create the compressed file 300.

As depicted in FIG. 8, if dynamic dictionary data 800 is created, the information processing apparatus 100 stores the dynamic dictionary data 800 in addition to the static dictionary data 400. The dynamic dictionary data 800 is data obtained by extracting information concerning the concatenated basic words included in the object data 102, from another static dictionary data 400 having the same data structure as the static dictionary data 400 depicted in FIG. 4. The information processing apparatus 100 adds the dynamic dictionary data 800 to the compressed data 104 in addition to the static dictionary data 400 so as to create the compressed file 300.

If a computer that decompresses the compressed data 104 also has the static dictionary data 400 used for the compression, the information processing apparatus 100 may add the ID of the static dictionary data 400 alone to the compressed data 104. In this case, the information processing apparatus 100 creates and adds the dynamic dictionary data 800 to the compressed data 104, separately from the static dictionary data 400 so as to create the compressed file 300. As a result, the information processing apparatus 100 can reduce a size of the compressed file 300.

An example of an identification process of the information processing apparatus 100 will be described with reference to FIGS. 9 and 10.

Figure 9:
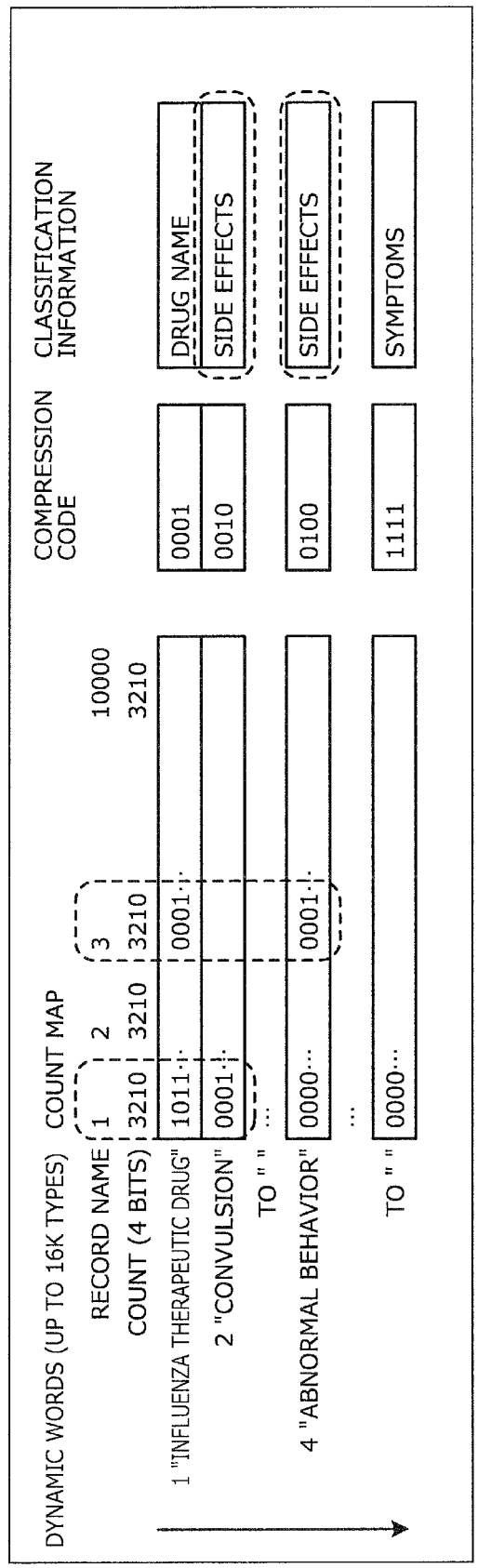
FIGS. 9 and 10 are explanatory views of an example of an identification process of the information processing apparatus 100.

FIG. 9 is an explanatory view of an example of the identification process of the information processing apparatus 100. In FIG. 9, the information processing apparatus 100 identifies the second keyword 103 that is of a predetermined word type and that corresponds to the first keyword 101 defined as a search condition for the object data 102.

For example, the information processing apparatus 100 receives input of the first keyword 101 "influenza therapeutic drug". The information processing apparatus 100 then identifies the second keywords 103 "convulsion", "abnormal behavior", and "hallucination" appearing in the same records as the first keyword 101 "influenza therapeutic drug", among the words of the word type "side effect".

The information processing apparatus 100 counts the number of records that include the respective keywords, and calculates and outputs the property indexes of the respective keywords together with the respective keywords. A property index Wij is, for example, TF-IDF and is calculated by Wij=tfij·idfi; where, tfij=the appearance count of a word i of a document Dj/the total number of words of the document Dj is satisfied. Further, idfi=log (the total number of documents/ the number of documents including the word i) is satisfied. As a result, the information processing apparatus 100 can calculate the property index of the second keyword 103 without decompressing the compressed data 104.

Figure 10:
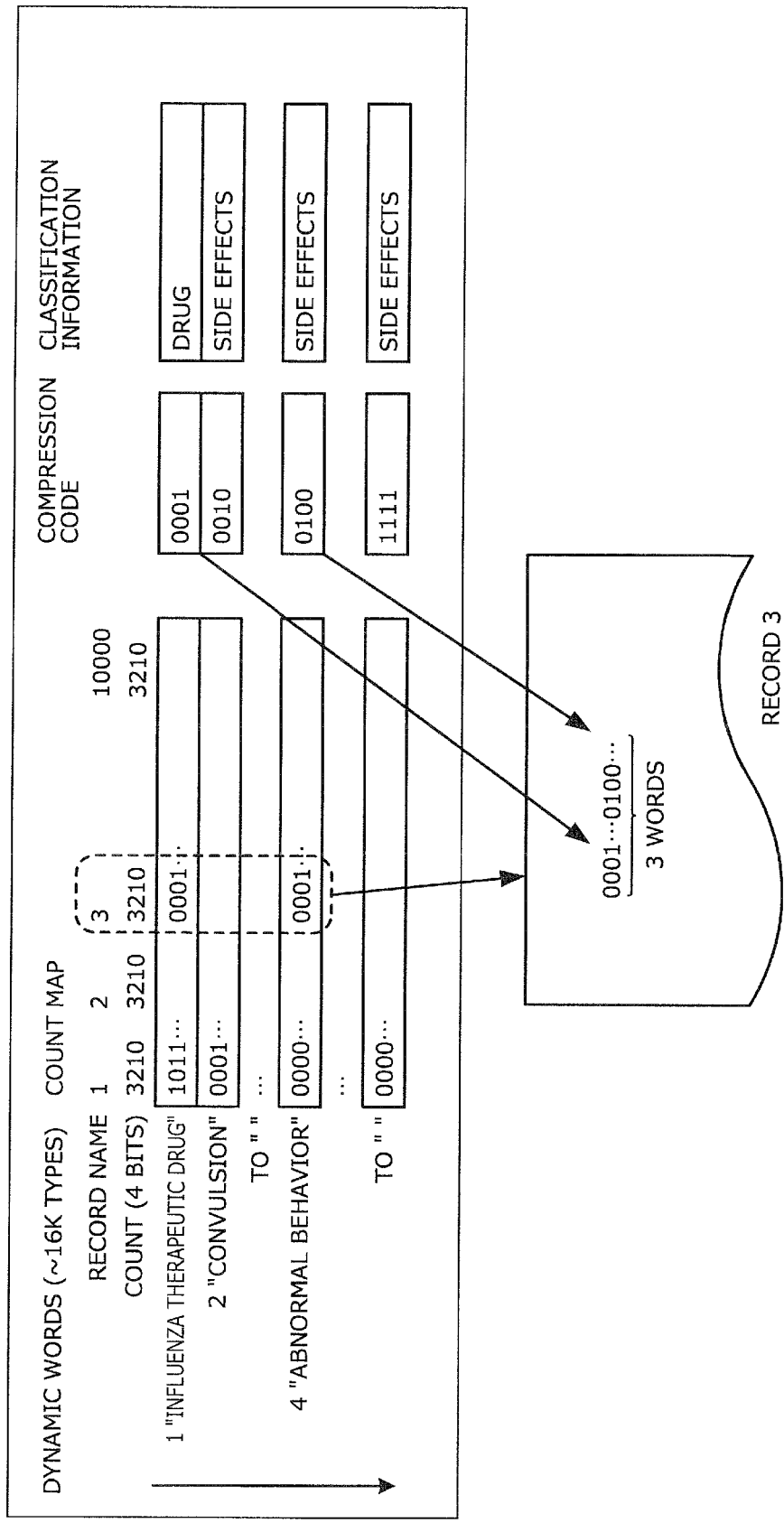

In FIG. 10, the information processing apparatus 100 obtains a first code "0001" corresponding to the first keyword 101 "influenza therapeutic drug". The information processing apparatus 100 then obtains a second code "0100" corresponding to the second keyword 103 "abnormal behavior". The information processing apparatus 100 identifies from the count map, a record 3 in which both the first keyword 101 and the second keyword 103 appear.

The information processing apparatus 100 counts the number of words "3" from the first code to the second code in the record 3 and determines whether the second code appears within a predetermined number of words from the first code. For example, the number of words is counted by counting the number of compression codes from the first code to the second code. For example, the number of words may be counted by counting the number of compression codes and uncompressed words from the first code to the second code. In the same way, the information processing apparatus 100 counts records in which the second code appears within a predetermined number of words from the first code. As a result, the information processing apparatus 100 can identify the records in which the second keyword 103 co-occurs with the first keyword 101 without decompressing the compressed data 104.

An example of an output result of the information processing apparatus 100 will be described with reference to FIG. 11.

Figure 11:
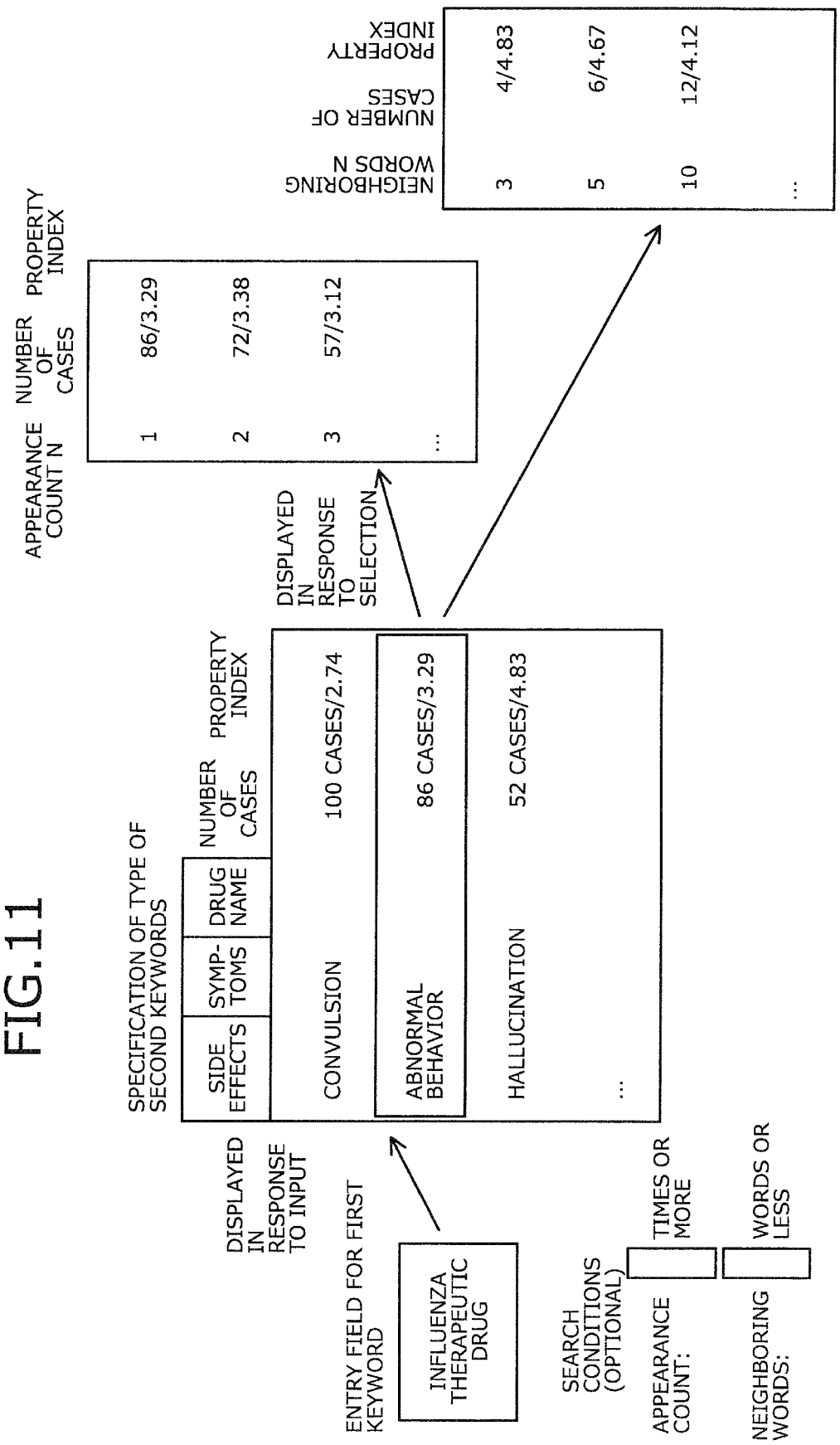
FIG. 11 is an explanatory view of an example of an output result of the information processing apparatus 100.

FIG. 11 is an explanatory view of an example of an output result of the information processing apparatus 100. In FIG. 11, when receiving input of the first keyword 101, the information processing apparatus 100 identifies the second keywords 103, counts the number of records including the second keywords 103, and calculates and outputs the property indexes of the second keywords 103.

In the example depicted in FIG. 11, the information processing apparatus 100 receives input of the first keyword 101 "influenza therapeutic drug". The information processing apparatus 100 then identifies the second keywords 103 such as "convulsion", "abnormal behavior", and "hallucination" that are of the word type "side effect" and that correspond to the first keyword 101 "influenza therapeutic drug". The information processing apparatus 100 counts the number of records that include the respective keywords, and calculates and outputs the property indexes of the respective keywords together with the respective keywords.

The information processing apparatus 100 identifies the second keywords 103 that are of a word type "symptom" and that correspond to the first keyword 101. The information processing apparatus 100 counts the number of records that include the respective keywords, and calculates and outputs the property indexes of the respective keywords together with the respective keywords.

The information processing apparatus 100 identifies the second keywords 103 that are of a word type "drug name" and that correspond to the first keyword 101. The information processing apparatus 100 counts the number of records that include the respective keywords, and calculates and outputs the property indexes of the respective keywords together with the respective keywords.

If a keyword is selected from among the keywords, the information processing apparatus 100 counts the number of records for each appearance count to calculate and output the property index of keywords for each appearance count of the selected keyword.

If a keyword is selected from among the keywords, the information processing apparatus 100 counts and outputs for the selected keyword, the number of records for each number of words from the first keyword 101 to the second keyword 103. The information processing apparatus 100 calculates and outputs for the selected keyword, the property index of keywords for each number of words from the first keyword 101 to the second keyword 103.

This enables the information processing apparatus 100 to supply to the user, the number of records and the property indexes related to the second keywords 103, as analysis support data. As a result, the user can analyze the second keywords 103 based on the output result.

An example of a compression process procedure of the information processing apparatus 100 will be described with reference to FIG. 12.

FIG. 12 is a flowchart of an example of the compression process procedure of the information processing apparatus 100. In FIG. 12, the information processing apparatus 100 extracts from the static dictionary data 400, words appearing in the object data 102 and the classification information of the words (step S1201).

The information processing apparatus 100 assigns code to each of the extracted words (step S1202). The information processing apparatus 100 creates the dynamic dictionary data 800 in which the extracted words, the codes assigned to the words, and the classification information of the extracted words are correlated (step S1203).

The information processing apparatus 100 encodes the object data 102 for each word, in units of records, based on the static dictionary data 400 and the dynamic dictionary data 800 to compress the object data 102 (step S1204). The information processing apparatus 100 creates the header portion 301, which includes the ID of the static dictionary data 400 (step S1205).

The information processing apparatus 100 creates the trailer portion 302, which includes the dynamic dictionary data 800 (step S1206). The information processing apparatus 100 combines the header portion 301, the compressed data 104, and the trailer portion 302 to create the compressed file 300 (step S1207) and terminates the compression process.

As a result, when compressing the object data 102, the information processing apparatus 100 can create the count map 105 used for identifying the second keyword 103 from the object data 102.

An example of an identification process procedure of the information processing apparatus 100 will be described with reference to FIG. 13.

FIG. 13 is a flowchart of an example of the identification process procedure of the information processing apparatus 100. In FIG. 13, the information processing apparatus 100 receives input of the first keyword 101 that is a search word for the object data 102 (step S1301). The information processing apparatus 100 then obtains a search condition (step S1302).

The information processing apparatus 100 obtains the count map 105 added to the compressed data 104 (step S1303). The information processing apparatus 100 identifies based on the search condition and the count map 105, a second keyword 103 that corresponds to the first keyword 101 (step S1304).

The information processing apparatus 100 counts the number of records in which the second keyword 103 appears a predetermined number of times or more (step S1305). The information processing apparatus 100 counts the number of records in which the second keyword 103 appears within a predetermined number of words from the first keyword (step S1306).

The information processing apparatus 100 calculates the property index of the second keyword 103 (step S1307). The information processing apparatus 100 outputs the second keyword 103, each counted number of records, and the calculated property index (step S1308).

The information processing apparatus 100 terminates the identification process. As a result, the information processing apparatus 100 can identify the second keyword 103 corresponding to the first keyword 101 without decompressing the compressed data 104 and can make the identification process of the keyword more efficient.

As described, according to the information processing system, when the object data 102 is compressed for each word in units of records, the count map 105 can be created and added to the compressed data 104. Therefore, the information processing system can identify a second keyword 103 that corresponds to the first keyword 101 without decompressing the compressed data 104 and can handle various keywords. The information processing system can identify the second keyword 103 without decompressing the compressed data 104 and can make the identification process of the second keyword 103 more efficient.

The information processing system can identify the second keyword 103 without decompressing the compressed data 104 and can execute the identification process of the second keyword 103 even if the size of the storage apparatus is limited. The information processing system can create information such as the count map 105 used for analysis of the object data 102 when the object data is compressed, thereby reducing the period from the input of the first keyword 101 until the identification of the second keyword 103.

By adding the count map 105 to the compressed data 104, the information processing system can easily manage the compressed data 104 and the count map 105 in a correlated manner. By adding the count map 105 to the compressed data 104, the information processing system can reduce the size of the storage area used for the compressed data 104 and the count map 105 as compared to a case of separately managing the compressed data 104 and the count map 105.

The information processing system can create and add to the compressed data 104, the classification data that indicates the type of each word. This enables the information processing system to notify the user of the second keyword 103 identified for each type of word, as analysis support data. As a result, the user can analyze the second keyword 103 based on the output result.

The information processing system can output the number of records in which the second keyword 103 appears, together with the second keyword 103. This enables the information processing system to supply to the user, the number of records in which the second keyword 103 appears, as analysis support data. As a result, the user can analyze the second keyword 103 based on the output result.

The information processing system can output the number of records in which the second keyword 103 appears within the predetermined number of words from the first keyword 101, together with the second keyword 103. This enables the information processing system to supply to the user, the number of records in which the second keyword 103 appears within a predetermined number of words from the first keyword 101, as analysis support data. As a result, the user can analyze the second keyword 103 based on the output result.

The information processing system can output the number of records in which the second keyword 103 appears a predetermined number of times or more, together with the second keyword 103. This enables the information processing system to supply to the user, the number of records in which the second keyword 103 appears a predetermined number of times or more, as analysis support data. As a result, the user can analyze the second keyword 103 based on the output result.

The information processing system can compress the object data 102 by using the static dictionary data 400 and can add the static dictionary data 400 and the count map 105 to the compressed data 104. The information processing system may compress the object data 102 by using the static dictionary data 400 and the dynamic dictionary data 800 and may add the static dictionary data 400, the dynamic dictionary data 800, and the count map 105 to the compressed data 104. This enables the information processing system to reduce the amount of data used.

The information processing system can calculate the property index for the second keyword 103. This enables the information processing system to supply to the user, the property index for the second keyword 103, as analysis support data. As a result, the user can analyze the second keyword 103 based on the output result.

It is conceivable that another keyword input concurrently with the first keyword 101 is identified as the second keyword 130 by referring to a database that accumulates combinations of concurrently input keywords. However, in this case, a keyword irrelevant to the contents of the object data 102 may be identified. In contrast, since the count map 105 corresponding to the contents of the object data 102 is created and added to the compressed data 104, the information processing system can identify a second keyword 103 conforming to the contents of the object data 102.

The information processing method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

An aspect of the present invention produces an effect that various input keywords can be handled.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium storing an information processing program that causes a computer to execute a process comprising:

creating count map data from object data when the object data is compressed, the object data including a plurality of record units, the object data being compressed by units of words, the count map data being created for each of the plurality of record units, respectively, and indicating appearance counts of words included in the each of the plurality of record units;

adding the count map data to compressed object data that has been compressed from the object data;

specifying a first character string for a search condition for the object data; and identifying a second character string that has a co-occurrence relationship with the first character string in the object data utilizing the count map data.

2. The non-transitory, computer-readable recording medium according to claim 1, wherein the creating creates classification data that indicates a type of each word, the adding adds the classification data to the compressed object data, and the identifying identifies based on the count data and the classification data, the second character string that corresponds to a classification and the first character string defined as search conditions for the object data.

3. The non-transitory, computer-readable recording medium according to claim 1, wherein the process further comprises:

counting a number of records that include the identified second character string, in the object data.

4. The non-transitory, computer-readable recording medium according to claim 3, wherein the creating creates code data that indicates a compression result of each word, the adding adds the code data to the compressed object data, and the counting counts based on the code data, the number of records in which the identified second character string appears within a predetermined number of words from the first character string, in the object data.

5. The non-transitory, computer-readable recording medium according to claim 3, wherein the counting counts based on the count data, the number of records in which the identified second character string appears a predetermined number of times or more in the object data.

6. The non-transitory, computer-readable recording medium according to claim 1, wherein the process further comprises:

extracting from the object data, a word that is identical to a word within a predetermined number of words from the first character string, and the creating, when the object data is compressed for each word in units of records, creates the count data that indicates for each record of the object data; and the adding adds to the compressed object data, the appearance count of each extracted word.

7. The non-transitory, computer-readable recording medium according to claim 1, wherein the process further comprises:

calculating a property index of the second character string, based on the count data.

8. An information processing system comprising:

a memory; and a processor coupled to the memory and the processor configured to:

create count map data from object data when the object data is compressed, the object data including a plurality of record units, the object data being compressed by units of words, the count map data being created for each of the plurality of record units, respectively, and indicating appearance counts of words included in the each of the plurality of record units;

add the count map data to compressed object data that has been compressed from the object data;

specify a first character string for a search condition for the object data; and identify a second character string that has a co-occurrence relationship with the first character string in the object data utilizing the count map data.

9. An information processing method comprising:

creating count map data from object data when the object data is compressed, the object data including a plurality of record units, the object data being compressed by units of words, the count map data being created for each of the plurality of record units, respectively, and indicating appearance counts of words included in the each of the plurality of record units;

adding the count map data to compressed object data that has been compressed from the object data;

specifying a first character string for a search condition for the object data; and identifying a second character string that has a co-occurrence relationship with the first character string in the object data utilizing the count map data.

* * * * *